United States Patent
Laster et al.

(10) Patent No.: US 11,952,709 B2
(45) Date of Patent: Apr. 9, 2024

(54) UNDER FURNITURE LAUNDRY RECEPTACLE

(71) Applicant: Kid Kind LLC, Watauga, TX (US)

(72) Inventors: Lindsay Laster, Watauga, TX (US); Kyle Laster, Watauga, TX (US)

(73) Assignee: Kid Kind LLC, Watauga, TX (US)

( * ) Notice: Subject to any disclaimer, the term of this patent is extended or adjusted under 35 U.S.C. 154(b) by 254 days.

(21) Appl. No.: 17/712,964

(22) Filed: Apr. 4, 2022

(65) Prior Publication Data

US 2022/0341088 A1 Oct. 27, 2022

Related U.S. Application Data

(60) Provisional application No. 63/201,341, filed on Apr. 24, 2021.

(51) Int. Cl.
*D06F 95/00* (2006.01)
*B62B 3/00* (2006.01)
*B62B 5/06* (2006.01)

(52) U.S. Cl.
CPC ............ *D06F 95/002* (2013.01); *B62B 3/002* (2013.01); *B62B 5/06* (2013.01); *B62B 2202/66* (2013.01)

(58) Field of Classification Search
CPC ......... D06F 95/002; B62B 3/002; B62B 5/06; B62B 2202/66; B62B 1/206; B62B 3/02; B62B 5/067; B65D 25/2808; B65D 85/18; B65D 85/187; A47C 17/86; A47B 88/41
See application file for complete search history.

(56) References Cited

U.S. PATENT DOCUMENTS 3,958,715 A * 5/1976 Capelli .................. B65D 25/04
220/532
4,597,122 A * 7/1986 Handler .................. A47B 88/41
5/503.1

(Continued)

FOREIGN PATENT DOCUMENTS

CN     206615553 U   * 11/2017
CN     208755470 U   * 4/2019

(Continued)

OTHER PUBLICATIONS

Translated CN-206615553-U (Year: 2024).*

*Primary Examiner* — James A Shriver, II
*Assistant Examiner* — Ian Bryce Shelton
(74) *Attorney, Agent, or Firm* — Nolan Heimann LLP; Adam Diament

(57) ABSTRACT

A laundry hamper adapted to fit under furniture and contain articles of clothing is disclosed. The laundry hamper includes a receptacle having an interior volume with an opening. The laundry hamper includes a rim positioned along the opening of the receptacle. The laundry hamper includes a plate that is not incorporated with the laundry hamper. The laundry hamper includes a flexible connecting member connecting the plate via a handle at one end and connecting the rim at other end. The receptacle positions under the furniture and the plate on or within the furniture. The receptacle receives articles of clothing through the opening. The handle detaches from the plate and allows a user pull out the receptacle from under the furniture with the help of the flexible connecting member.

15 Claims, 11 Drawing Sheets

(56) References Cited

U.S. PATENT DOCUMENTS

| | | | | |
|---|---|---|---|---|
| 5,070,556 | A | * 12/1991 | Gloger | A47C 19/005 |
| | | | | 312/334.25 |
| 6,752,286 | B2 | 6/2004 | Liu | |
| 7,390,011 | B1 | 6/2008 | Hem | |
| 7,448,530 | B1 | * 11/2008 | Winikoff | D06F 95/002 |
| | | | | 232/44 |
| 7,677,408 | B2 | * 3/2010 | Loucks | D06F 95/002 |
| | | | | 220/756 |
| 8,602,423 | B1 | * 12/2013 | Alexander | B62B 3/165 |
| | | | | 280/30 |
| 8,656,533 | B2 | * 2/2014 | Grossman | A47B 95/002 |
| | | | | 5/493 |
| 9,108,655 | B2 | * 8/2015 | Sebastian | B62B 1/125 |
| 9,481,960 | B2 | * 11/2016 | Sofy | B65D 25/30 |
| 9,745,116 | B1 | * 8/2017 | Lopez | B62B 1/125 |
| 9,869,055 | B2 | * 1/2018 | Zephir | D06F 95/002 |
| 10,167,591 | B1 | * 1/2019 | Rodgers, Jr. | D06F 95/002 |
| 11,059,625 | B2 | * 7/2021 | Sofy | B62B 1/12 |
| 2003/0178800 | A1 | * 9/2003 | Fite | B62B 1/10 |
| | | | | 280/47.38 |
| 2005/0189360 | A1 | * 9/2005 | Loucks | D06F 95/002 |
| | | | | 220/676 |
| 2007/0187912 | A1 | * 8/2007 | Taulman | D06F 95/002 |
| | | | | 280/47.26 |
| 2009/0025141 | A1 | * 1/2009 | Ray | A47C 17/136 |
| | | | | 5/20 |
| 2011/0095496 | A1 | * 4/2011 | Kassab Arabo | B62B 1/006 |
| | | | | 280/47.26 |
| 2011/0226641 | A1 | * 9/2011 | Vensel | D06F 95/002 |
| | | | | 206/278 |
| 2014/0210171 | A1 | * 7/2014 | Sebastian | B62B 1/125 |
| | | | | 280/33.998 |
| 2014/0245933 | A1 | * 9/2014 | Leslie | A47C 17/86 |
| | | | | 108/50.11 |
| 2017/0137992 | A1 | * 5/2017 | Zephir | D06F 95/002 |
| 2017/0253378 | A1 | * 9/2017 | Barre | D06F 95/002 |
| 2017/0265430 | A1 | * 9/2017 | Renforth | A01K 1/0254 |
| 2019/0142176 | A1 | * 5/2019 | Schneidewent | A47B 23/00 |
| | | | | 5/503.1 |
| 2019/0360147 | A1 | * 11/2019 | Wang | D06F 95/002 |
| 2022/0106073 | A1 | * 4/2022 | Qu | B65D 13/04 |
| 2022/0275569 | A1 | * 9/2022 | Cohen | D06F 95/002 |

FOREIGN PATENT DOCUMENTS

| | | | |
|---|---|---|---|
| CN | 111150263 A * 5/2020 | | A47C 19/205 |
| DE | 202010014818 U1 * 2/2011 | | A47B 61/00 |
| DE | 202013006941 U1 * 12/2013 | | A47B 61/04 |
| DE | 202020100522 U1 * 6/2020 | | |
| GB | 2310361 A * 8/1997 | | A47B 67/04 |
| GB | 2513335 A * 10/2014 | | D06F 95/002 |
| KR | 102165605 B1 * 10/2020 | | |
| WO | WO-2020221469 A1 * 11/2020 | | B60B 33/001 |

* cited by examiner

UNDER FURNITURE LAUNDRY RECEPTACLE

CROSS-REFERENCE TO RELATED APPLICATIONS

This application claims priority and benefit to U.S. Provisional Patent Application 63/201,341, filed Apr. 24, 2021, to Laster and Laster, the contents of which are incorporated in its entirety, for all purposes.

FIELD OF THE DISCLOSURE

The present invention relates to a laundry receptacle, and more specifically, to a laundry receptacle that can easily be stored and removed from under furniture.

BACKGROUND OF THE INVENTION

The space in a room of a house is limited and articles of clothing on the floor can be a source of embarrassment when seen by others. In order to overcome the problem of storing the articles of clothing, laundry receptacles and under-bed storage containers are used. Laundry receptacles such as hampers and baskets are typically positioned upright in bedrooms, bathrooms, or laundry rooms to store articles of clothing prior to washing. Under-bed storage containers are used to obscure clean articles of clothing that would otherwise be on display from view or facilitate easy movement out of view.

Several attempts have been made in the past to provide different receptacles to overcome the above problem. One such example is disclosed in a U.S. granted Pat. No. 9,869,055, entitled "Rolling hamper" ("the '055 Patent"). The '055 Patent discloses a rolling hamper with a body with two sides, a front, a bottom and an expanded back portion. The body includes ventilation holes which may have fortified edges to avoid hazards for users. Wheels are removably coupled at the two back corners so that the hamper can be tipped back and rolled.

Another example is disclosed in U.S. Pat. No. 8,602,423, entitled "Wheeled laundry carrying device" ("the '423 Patent"). The '423 Patent discloses a wheeled laundry basket includes a basket, a plurality of wheel assemblies, and a rope pull. Each wheel assembly includes a rotating caster integrally connected to the basket. A top exterior edge of the basket provides integral connection to the rope, connected on both ends to the basket in order to provide a flexible extended handle for steering and rolling the basket along a ground surface.

Yet another example is disclosed in a U.S. Pat. No. 7,390,011, entitled "Space saver" ("the '011 Patent"). The '011 Patent discloses a device, which allows the storage of laundry in the upright position and also allows the device to be stowed easily when not storing laundry. Because of the ability of the device to be compressed, stowage is easily accomplished. Handles are provided on the top surface of the hamper for ease of storage.

Yet another example is disclosed in a U.S. Pat. No. 10,167,591, entitled "Laundry hamper with rotating handle and grip" ("the '591 Patent"). The '591 Patent discloses a laundry hamper adapted to contain articles of clothing in transit. The laundry hamper includes a basin with a bottom and four sides connected to a rounded upper lip. A first handle connection point is attached to the rounded upper lip proximate the first side. A second handle connection point is attached to the upper lip proximate the third side. A handle includes a first handle rotation attachment point is rotationally attached to the first handle connection point. A first handle riser portion is joined to the first handle rotation attachment point and a first handle rounded portion. A handle crossing portion is joined to the first and second handle rounded portions. A second handle riser portion is joined to the handle crossing portion and a second handle rotation attachment point. The second handle rotation attachment point is rotationally coupled to the second handle rotation attachment point.

Although the above discussed disclosures are useful, they have a few limitations. For instance, current receptacles and containers require users to drop the articles of clothing by hand into the container and rely on gravity to pull the articles of clothing to the desired position (i.e. bottom of the receptacle). The act of dropping requires the user to first lift the articles of clothing by hand to the height needed to enter the container opening generally located on the uppermost section of the form when in use. In the case of laundry, this is inconvenient when articles of clothing are left on the floor, requiring individuals to contort their body to pick the articles of clothing up (i.e. bending) before depositing the articles of clothing in the receptacle or container.

Thus, there is a need in the art for a laundry hamper that allows articles of clothing entry from ground-level, eliminating bodily contortion for the user when assembling articles of clothing.

BRIEF SUMMARY OF THE PRESENT INVENTION

It is an object of the present invention to provide a laundry hamper adapted to fit under a furniture and contain articles of clothing and that avoids the drawbacks of known receptacles or laundry hampers.

It is another object of the present invention to provide a laundry hamper that fits under a furniture and allows a user to place the articles of clothing such as soiled articles of clothing without having to bend over.

It is another object of the present invention to provide a laundry hamper that fits under a furniture utilising the unutilized area and saves the space in the room.

In some aspects, the techniques described herein relate to a laundry hamper, adapted to fit under a furniture and contain articles of clothing, the laundry hamper including: a receptacle having an interior volume and an opening at one end; a rim formed at the opening of the receptacle; a plate not integrated with the receptacle, a flexible connecting member; and a handle connected to the flexible connecting member, wherein the flexible connecting member connects to the handle at the rim at another end, wherein the handle is detachable from the plate, wherein the flexible connecting member connects the plate to the receptacle via the handle, whereby when a user detaches the handle from the plate, the user is able to pull the receptacle out from under the furniture without removing the plate from the furniture.

In some aspects, the techniques described herein relate to a laundry hamper, wherein the receptacle includes a plurality of receptacle handles positioned on sidewalls of the receptacle.

In some aspects, the techniques described herein relate to a laundry hamper, wherein the receptacle includes wheels at an opposite end of the opening, and wherein the wheels allow the receptacle to be transported from one location to another.

In some aspects, the techniques described herein relate to a laundry hamper, wherein the receptacle includes aeration holes.

In some aspects, the techniques described herein relate to a laundry hamper, wherein the flexible connecting member is one of a rope, cord, leash, string, and tether.

In some aspects, the techniques described herein related to a laundry hamper wherein the plate is an L-shaped bracket having a first planar region and a second planar region, wherein the second planar region is substantially perpendicular to the first planar region, and wherein the L-shaped bracket (or any other type of plate) is made from a ferromagnetic material, and wherein the handle is magnetic, thereby allowing the handle to magnetically attach and detach from the L-shaped bracket.

In some aspects, the techniques described herein relate to a laundry hamper where in the plate comprises a means for securing the plate to a mattress.

In some aspects, the techniques described herein relate to a laundry hamper, wherein the rim includes an angled lip at a bottom end of the receptacle, and wherein the angled lip allows the articles of clothing to be slid into the receptacle.

In some aspects, the techniques described herein relate to a laundry hamper, wherein the second planar region of the L-shaped bracket is designed to be inserted within the furniture.

In some aspects, the techniques described herein related to a laundry hamper, wherein the plate is affixed to the furniture at a height above the receptacle of the laundry hamper when the receptacle is laid in a horizontally flat orientation.

In some aspects, the techniques described herein relate to a laundry hamper, wherein the hamper further includes a pad forming an extension about the rim, the rim preventing the hamper from being pushed too far underneath the furniture and the pad for cushioning for user protection.

In some aspects, the techniques described herein relate to a laundry hamper, wherein the rim includes a rim handle, and wherein the rim handle allows pulling out the receptacle from under the furniture.

In some aspects, the techniques described herein relate to a laundry hamper, including: a receptacle having an interior volume and an opening at one end; a rim positioned at the opening of the receptacle, wherein the rim includes a rim handle; and, a pad forming an extension about the rim, wherein the receptacle positions under a furniture and receives articles of clothing through the opening, and wherein the rim handle allows pulling out the receptacle from under the furniture.

In some aspects, the techniques described herein relate to a method of providing a laundry hamper for fitting under a furniture and for placing articles of clothing, the method including steps of: providing a receptacle having an interior volume and an opening at one end; providing a rim formed at the opening of the receptacle; providing a plate not integrated with the receptacle; providing a flexible connecting member; providing a handle connected the flexible connecting member; positioning the receptacle under the furniture; connecting the plate substantially flush with the furniture; connecting the handle to the plate; inserting articles of clothing into the receptacle through the opening in a horizontal direction relative to a ground; and, pulling out the receptacle from under the furniture by pulling the handle, wherein the handle is positioned at a higher elevation with respect to the receptacle when the receptacle is positioned in a flat horizontal orientation.

In some aspects, the techniques described herein relate to a method, further including providing an angled lip at the rim corresponding to the opening of the receptacle for allowing the articles of clothing to enter the receptacle.

In some aspects, the techniques described herein relate to a method, wherein the furniture includes a mattress, wherein the plate is ferromagnetic, and wherein the plate comprises a means for securing to the mattress.

In some aspects, there is a device, apparatus, system, or method using or providing any of the elements described above or below, alone or in combination with each other.

In one advantageous feature of the present invention, the laundry hamper positions underneath the furniture utilising the space that is mostly left unused in a room/home. The laundry hamper's shallow box-like receptacle forms a cavity for receiving the articles of clothing. The user simply drops the articles of clothing on the floor (or clothes may already be piled on the floor), and the user kicks/places the articles of clothing into the receptacle without bending. This minimizes the bodily contortion (i.e., bending) for the specific purposes of accessing the receptacle, transportation, and deposition.

In another advantageous feature of the present invention, the laundry hamper includes a handle connecting the flexible connecting member that extends from the rim. The handle connects to the L-shaped bracket positioned between the mattress and the bed frame. The L-shaped bracket firmly sits under the mattress without affecting the function of the mattress. The user detaches the handle (which can be a magnetic handle) from the L-shaped bracket and pulls out the receptacle when the receptacle is filled with the articles of clothing (e.g., soiled articles of clothing) with the help of the flexible connecting member without putting much strain on his back.

In another advantageous feature of the present invention, the wheels at the rear end of the receptacle help to transport the receptacle from one location to another thereby reducing the effort of the user to carry it.

Features and advantages of the subject matter hereof will become more apparent in light of the following detailed description of selected embodiments, as illustrated in the accompanying FIGURES. As will be realized, the subject matter disclosed is capable of modifications in various respects, all without departing from the scope of the subject matter. Accordingly, the drawings and the description are to be regarded as illustrative in nature.

DETAILED DESCRIPTION OF EMBODIMENTS

Figure 1:
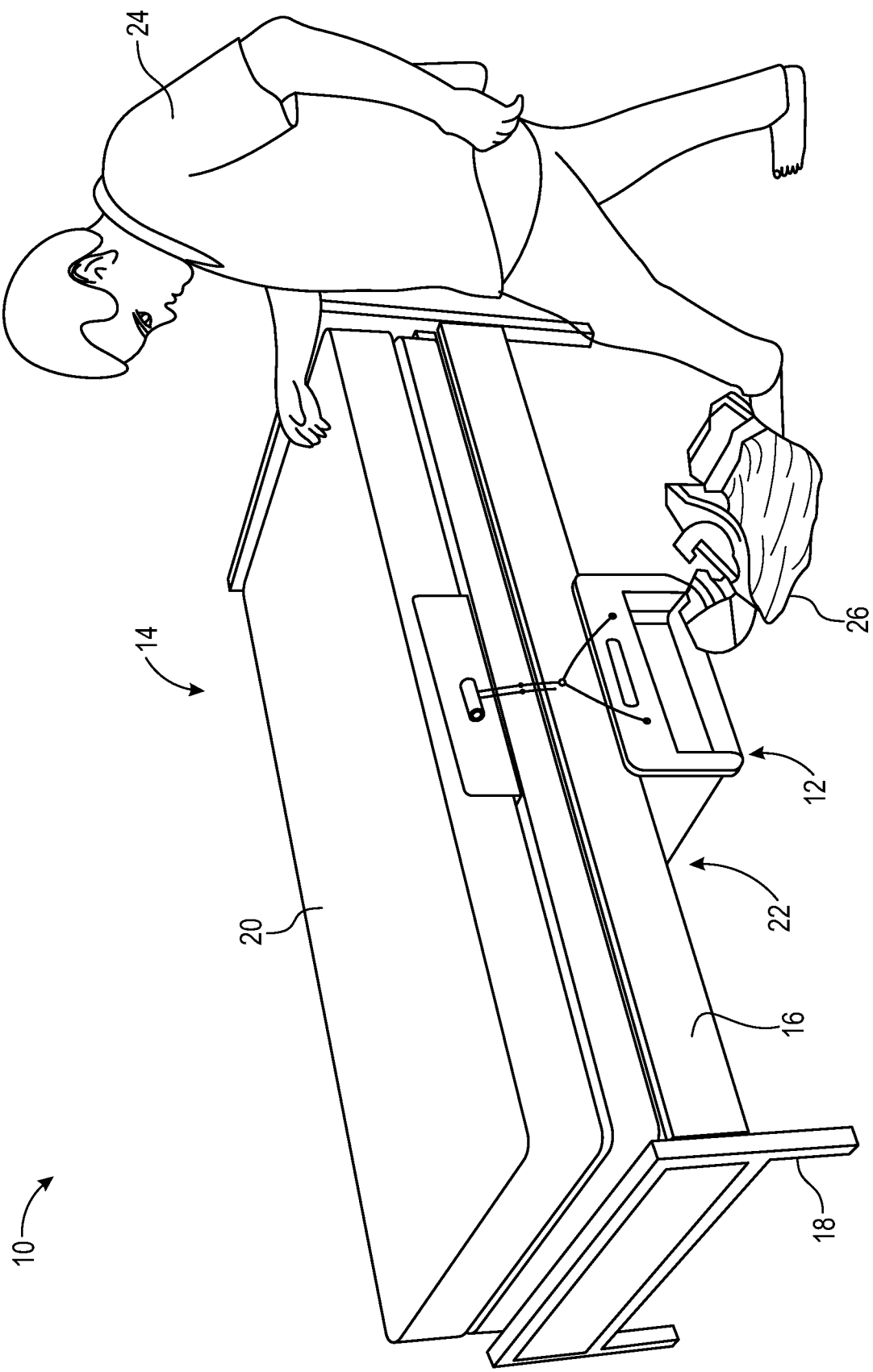
FIG. 1 illustrates an environment in which a laundry hamper implements, in accordance with one exemplary embodiment of the present invention.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealised or overly formal sense unless expressly so defined herein.

Exemplary embodiments of the present invention are described herein with reference to idealised embodiments of the present invention. As such, variations from the shapes of the illustrations as a result, for example, of manufacturing techniques and/or tolerances, are to be expected. The numbers, ratios, percentages, and other values may include those that are ±5%, ±10%, ±25%, ±50%, ±75%, ±100%, ±200%, ±500%, or other ranges that do not detract from the spirit of the invention. The terms about, approximately, or substantially may include values known to those having ordinary skill in the art. If not known in the art, these terms may be considered to be in the range of up to ±5%, ±10%, or other value higher than these ranges commonly accepted by those having ordinary skill in the art for the variable disclosed. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein. All patents, patent applications and non-patent literature cited through this application are hereby incorporated by reference in their entireties.

Turning to the Figures, FIG. 1 shows an environment 10 in which a laundry hamper or laundry receptacle or laundry basket 12 implements, in accordance with one exemplary embodiment of the present invention. Laundry hamper 12 rests underneath furniture 14 such as a bed, for example. Furniture 14 includes, but not limited to, bed, shelf, sofa and other household furniture. Furniture 14 includes bed frame 16 resting at a height from the ground with the help of legs 18. Bed frame 16 receives mattress 20. In accordance with the present invention, laundry hamper 12 positions in the space 22 between the ground and bed frame 16. User 24 places articles of clothing 26 in laundry hamper 12 by kicking articles of clothing 26 by force into laundry hamper 12.

Figure 2:
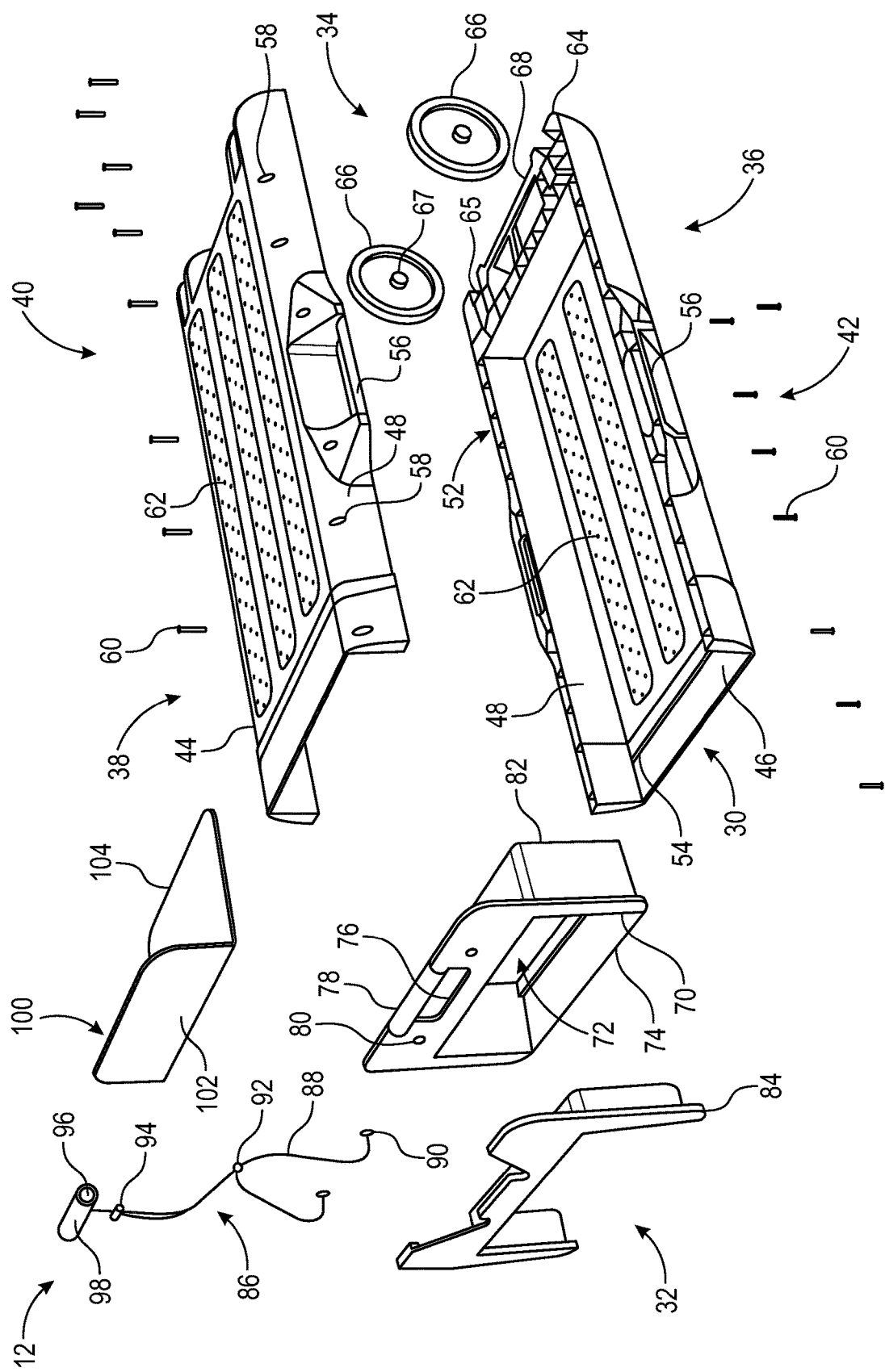
FIG. 2 illustrates an exploded view of the laundry hamper, in accordance with one embodiment of the present invention.
Figure 3A:
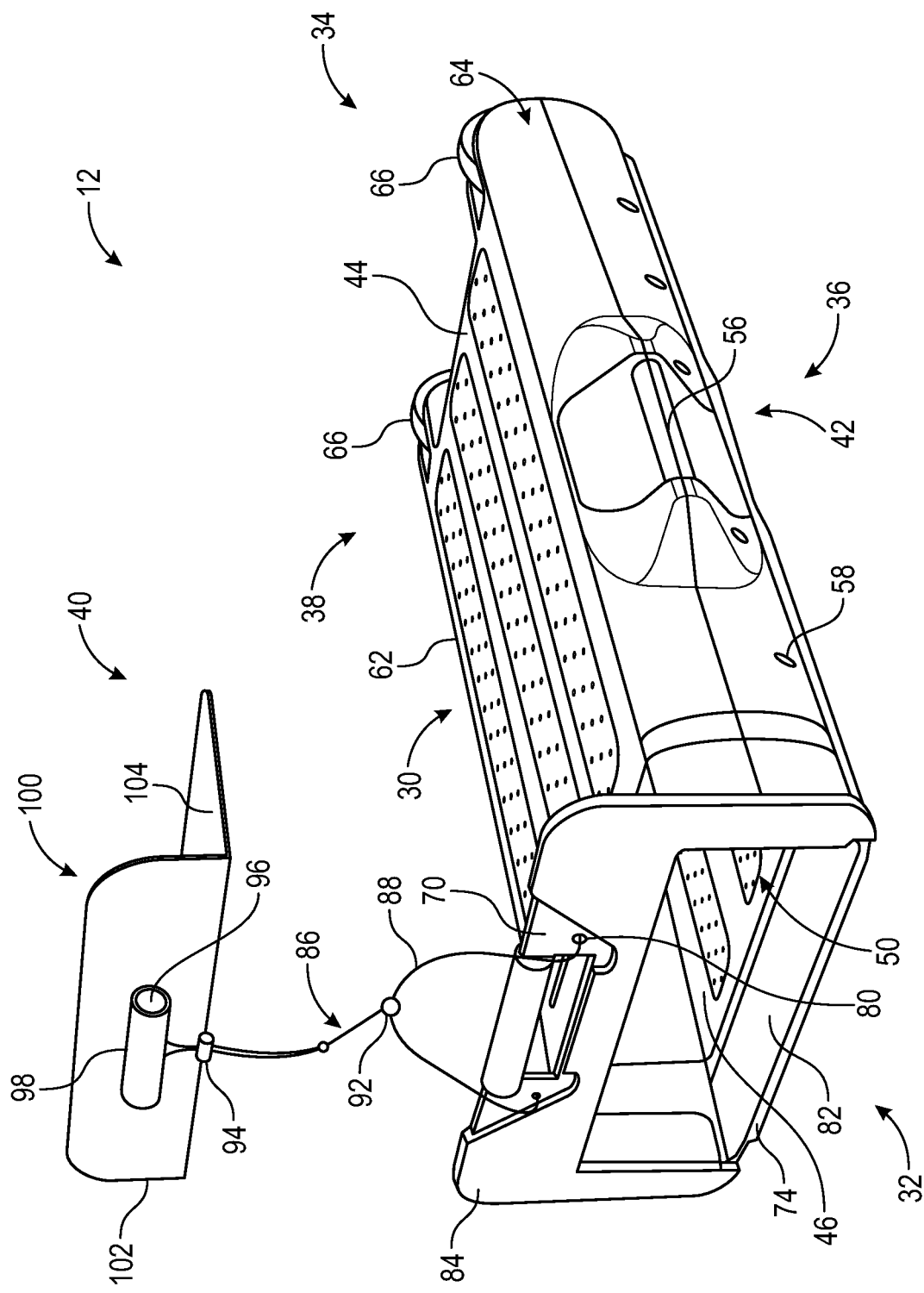
FIGS. 3A and 3B illustrate a front perspective view and a rear perspective view, respectively of the laundry hamper.
Figure 3B:
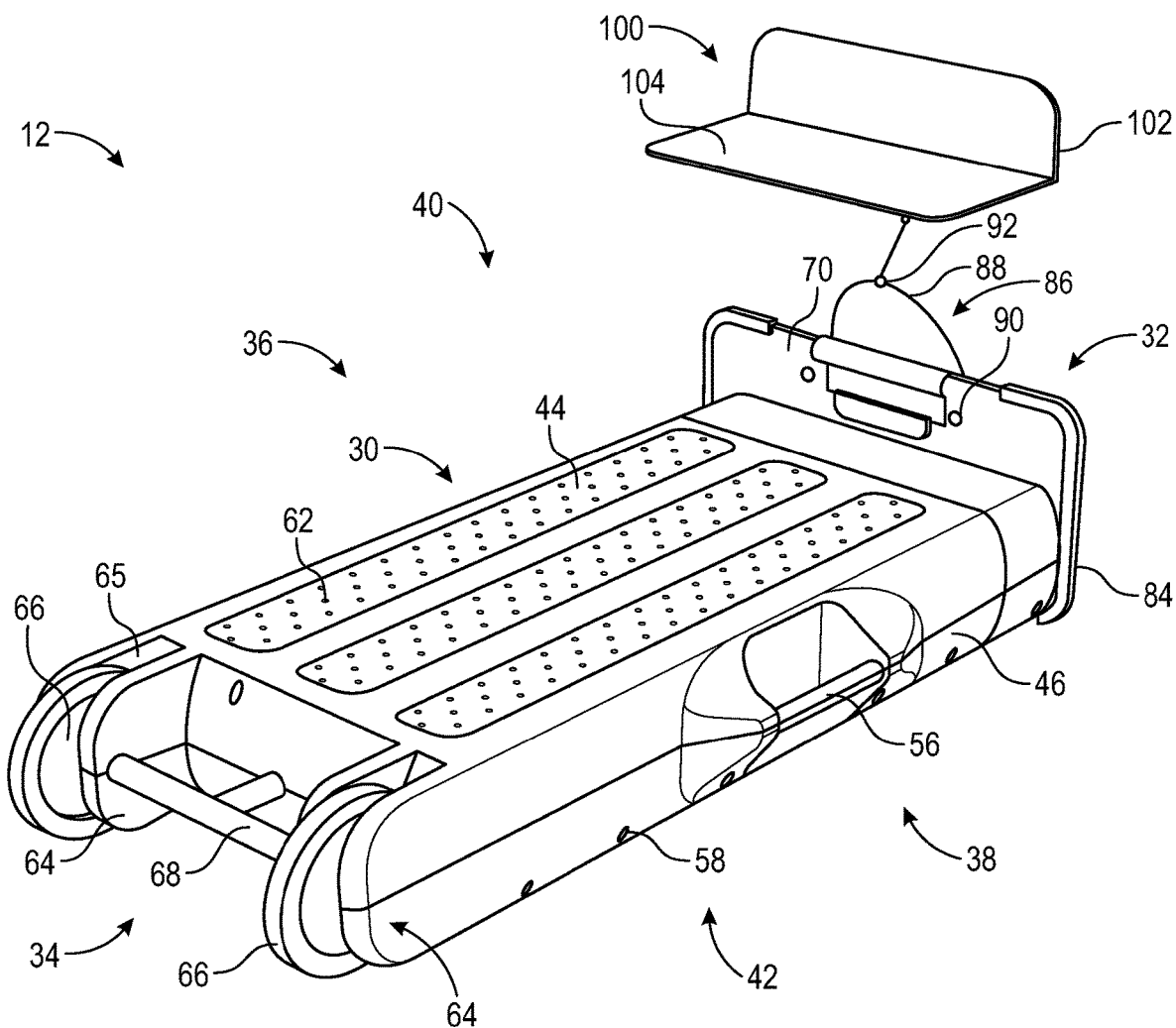

Referring to FIGS. 2, 3A and 3B, constructional features of laundry hamper 12 are explained. FIG. 2 shows an exploded view of laundry hamper 12, in accordance with one embodiment of the present invention. FIGS. 3A and 3B show a front perspective view and a rear perspective view, respectively of laundry hamper 12, in accordance with one embodiment of the present invention. Laundry hamper 12 includes receptacle or container 30. Receptacle 30 has first end 32, second end 34, first side (bottom) 36, second side (top) 38, forming top end 40 and bottom end 42. As shown in FIGS. 2, 3A, and 3B, the terms top and bottom refer to the parts of the hamper 12 when laid flat on the ground. First end 32 indicates a front end of receptacle 30. Second end 34 indicates a rear end of receptacle 30. First side 36 indicates a left or right side of receptacle 30. Assuming first side 36 is a left side, then second side 38 indicates a right side of receptacle 30. Top end 40 and bottom end 42 indicate a top portion and a bottom portion, respectively of receptacle 30. If the hamper 12 is lifted into an upright position, then the first end 32 becomes the top and the second end 34 becomes the bottom, but for ease of reference, relative directions and sides are described when the hamper 12 is laid down flat, and not upright.

Receptacle 30 includes first panel 44 and second panel 46. First panel 44 indicates an upper panel and second panel 46 indicates a lower panel. First panel 44 faces top end 40 and second panel 46 faces bottom end 42. Each of first panel 44 and second panel 46 presents a flat configuration and provides a material made of metal, plastic, wood or any other suitable material. Each of first panel 44 and second panel 46 includes sidewalls 48. Sidewalls 48 extend from three sides of first panel 44 and second panel 46 (i.e., from second end 34, first side 36 and second side 38 of first panel 44 and second panel 46) forming a three-sided closed receptacle 30 with an opening 50 at first end 32. It is understood that receptacle 30 has an interior volume for receiving contents such as articles of clothing 26 with first panel 44, second panel 46 and sidewalls 48. Sidewalls 48 include interlocking panels 52. Interlocking panels 52 of each sidewall 48 align with opposite sidewall 48 and help to connect sidewalls 48 to form receptacle 30. Although shown in FIG. 2 as separate first panel 44 and second panel 46 as top and bottom halves, it can be envisioned that the hamper 12 may be also molded as a single unit that does not separate into separate panels, not have clearly differentiated walls (due to curvature), and yet still having the necessary receptacle opening 50 for clothes 26.

Each of first panel 44 and second panel 46 encompasses interlocking panel edge 54 closer to opening 50 at first end 32. Interlocking panel edge 54 raises from each of first panel 44 and second panel 46. Further, receptacle 30 includes a plurality of receptacle handles 56 extending outwardly from sidewalls 48. Here, each receptacle handles 56 extends from sidewalls 48 facing first side 36 and second side 38. Receptacle handles 56 help user 24 to carry receptacle 30 from one place to another or to dispose articles of clothing 26 from receptacle 30. In one example, sidewalls 48 encompass holes 58. Holes 58 indicate pre-drilled holes in interlocking panels 52 at sidewalls 48. Holes 58 receive connectors 60 such as fasteners. Connectors 60 insert through holes 58 and connect sidewalls 48 of first panel 44 and second panel 46 thereby ensuring first panel 44 and second panel 46 remain intact while being vigorously shaken such as when articles of clothing 26 are forcefully removed from receptacle 30. Each of first panel 44 and second panel 46 includes aeration holes 62. Aeration holes 62 provide ventilation and prevent mold and mildew growth on articles of clothing 26 stored in receptacle 30.

At second end 34, receptacle 30 includes extended walls 64. Extended walls 64 extend from receptacle 30 and present grooves 65 for receiving wheels 66. Each wheel 66 includes wheel connectors 67. Wheel connectors 67 receive a connecting rod 68 that connects wheels 66.

Laundry hamper 12 includes a rim 70 forming a circumference around opening 50 of receptacle 30. Rim 70 positions at first end 32 of receptacle 30. Rim 70 includes opening 72 aligning with opening 50. Rim 70 may encompasses an angled lip or inclined region 74 around opening 72. In one implementation, angled lip 74 is formed at the bottom end 42 to allow clothes 26 to be easily slid into the opening 72, such as by sweeping the clothes in with the user's feet 24. In some embodiments, the rim 70 may not be a separate structure from the rest of the receptacle 30, and may be integral with the receptacle and the opening 72 of the rim would be the same as the opening 50 of the receptacle 30.

Further, rim 70 includes hole 76 forming a rim handle 78 for rim 70. Rim handle 78 allows a user to grip the laundry hamper 12 once the laundry hamper 12 is in its upright position. Rim 70 includes holes 80 for receiving flexible connecting member 88. In one implementation, rim 70 encompasses extending member 82 having a rectangular configuration. Extending member 82 extends from rim 70 and aligns with opening 72 of rim 70 facing second end 34. In accordance with the present invention, extending member 82 inserts through opening 50 of receptacle 30 and rests against interlocking panel edges 54 at first panel 44 and second panel 46. Here, interlocking panel edges 54 stop extending member 82 from going further into opening 50 of receptacle 30 and ensure rim 70 firmly secures to receptacle 30.

In one embodiment, rim 70 encompasses pad 84. Pad 84 wraps around rim 70. In one example, pad 84 wraps the entire circumference of rim 70 facing first end 32 of receptacle 30. In another example, pad 84 wraps rim 70 at three sides i.e., first side 36, second side 38 and top end 40 such that user 24 does not get injured when applying force to cause articles of clothing 26 to enter receptacle 30 through opening 50. Pad 84 indicates a cushion layer made of foam or any other soft material that wraps around rim 70 and ensures user 24 does not get injured when placing or kicking articles of clothing 26 into receptacle 30 (i.e., accidentally kicking rim 70 while placing articles of clothing 26 into receptacle 30).

Laundry hamper 12 further includes handle assembly 86. Handle assembly 86 encompasses flexible connecting members 88 with endpoints 90. Flexible connecting members 88 includes a rope, cord, leash, string, tether, or equivalent. Endpoints 90 indicate a knot, button, tie, weld, or equivalent at the end of flexible connecting members 88 that insert through holes 80 at rim 70. FIG. 3B shows the feature of endpoints 90 of flexible connecting members 88 inserting in holes 80, in accordance with one embodiment of the present invention. Flexible connecting members 88 present cord lock 92 and length adjuster 94. Cord lock 92 joins flexible connecting members 88 extending from rim 70. Length adjuster 94 helps to adjust the length of flexible connecting members 88. Flexible connecting members 88 extend and connects to handle 96. Handle 96 includes a magnetic member configured for connecting flexible connecting member 88 to plate 100, which acts as handle 96 binding host. In some embodiments the plate 100 is an L-shaped bracket, but can be a variety of shapes that has at least one planar surface for attachment. Although the plate is referred to as an L-shaped bracket throughout much of the specification, due to the embodiments shown in the figures, it should not be so narrowly construed as to require an L-shape. Handle 96 helps to remain itself and flexible connecting member 88 securely in place at a height in which minimal bodily contortion (i.e., bending) is required for user 24 to grip handle 96. In one example, handle 96 includes handle cushion 98 made of a soft cushioned material. Handle cushion 98 wraps around handle 96 and ensures user 24 hand is safe while operating laundry hamper 12. Although it is presented that handle 96 includes a magnetic member, it is possible to provide handle 96 in different forms such as a hook, clips, Velcro®, snap, latch, or any other equivalent connector mechanisms utilised for connecting flexible connecting member 88 to L-shaped bracket 100.

L-shaped bracket 100 provides a material such as metal e.g., ferromagnetic material including, but not limited to, iron, nickel, nickel, alloys, steel, etc. L-shaped bracket 100 allows to attach and detach flexible connecting member 88 with the help of handle 96. Alternatively, L-shaped bracket 100 provides a material such as hard plastic, wood or any other suitable material with a magnetic strip that helps to attach and detach flexible connecting member 88 with the help of handle 96. L-shaped bracket 100 encompasses first planar region 102 and second planar region 104. Second planar region 104 positions parallel to the ground and extends substantially perpendicular from first planar region 102. Each of first planar region 102 and second planar region 104 comes in a rectangular or square shaped configuration with rounded edges. However, each of first planar region 102 and second planar region 104 can come in different shapes or sizes depending on the need. In the present invention, second planar region 104 slips through and stays between bed frame 16 or box spring, and mattress 20 and first planar region 102 positions perpendicularly and adjacent to mattress 20 facing upwards, as shown in FIG. 1, for example.

Figure 4:
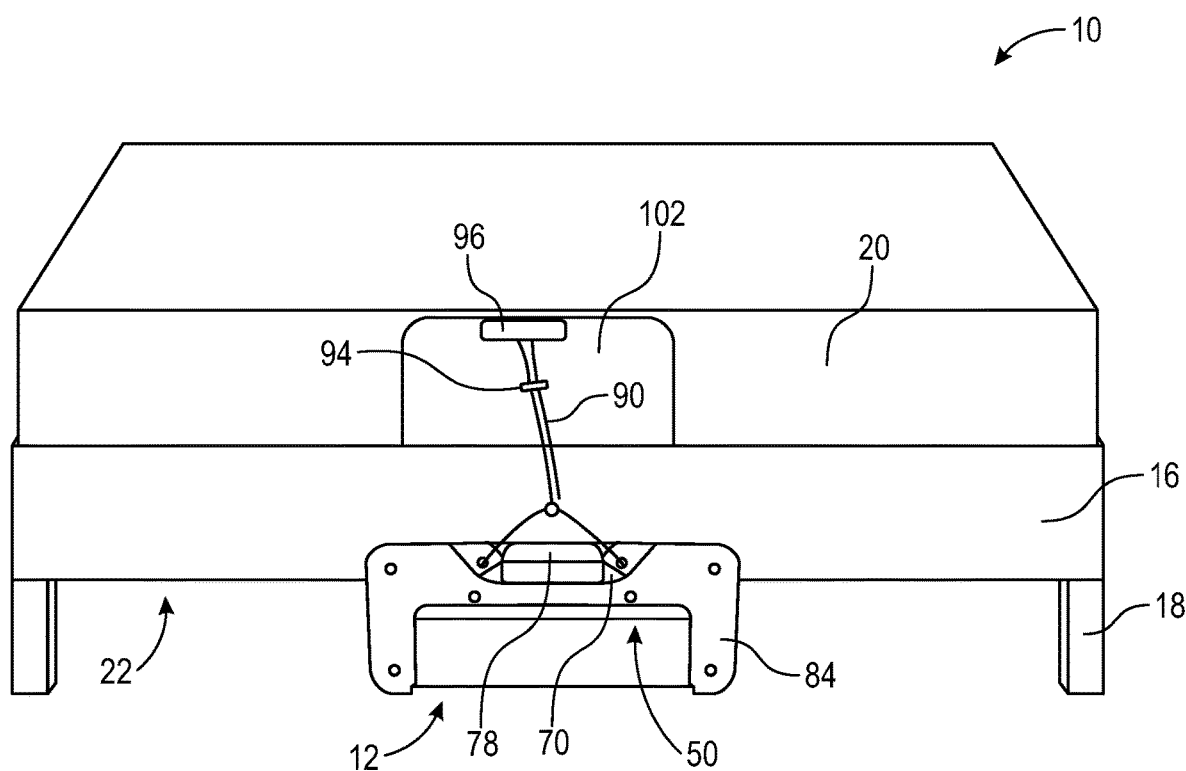
FIG. 4 illustrates a front view of the laundry hamper, in which a flexible connecting member connects to a L-shaped bracket via a handle.

In accordance with the present invention, receptacle 30 inserts underneath bed frame 16 i.e., space 22 between the ground and bed frame 16 exposing opening 50 of receptacle 30 from underneath furniture 14, as shown in FIGS. 1 and 4. Rim 70 mounts along to opening 50 of receptacle 30. Here, extending member 82 inserts through opening 50 and provides entry though opening 72 of rim 70 and into opening 50 of receptacle 30. As specified above, rim 70 encompasses angled lip 74 at opening 70. Angled lip 74 assists articles of clothing 26 to slide and enter into opening 50 easily when user 24 places articles of clothing 26 into receptacle 30. Further, user 24 places second planar region 104 of L-shaped bracket 100 between bed frame 16 and mattress 20. The weight of mattress 20 ensures L-shaped bracket 100 remains in place such that first planar region 102 of L-shaped bracket 100 raises towards and adjacent to mattress 20, as shown in FIGS. 1 and 4. Upon placing L-shaped bracket 100, user 24 connects flexible connecting member 88 to first planar region 102 of L-shaped bracket 100 via handle 96. FIG. 4 shows a front view of laundry hamper 12, in which flexible connecting member 88 is connected to L-shaped bracket 100 via handle 96. Alternatively, handle 96 connects at the back of rim 70 when user 24 is placing articles of clothing 26 in receptacle 30 such that flexible connecting member 88 does not come in the way of placing articles of clothing 26.

In use, user 24 drops articles of clothing 26 on ground i.e., floor in front of opening 50. Subsequently, user 24 kicks articles of clothing 26 into receptacle 30 through opening 50, as shown in FIG. 1. Alternatively, user 24 bends and places articles of clothing 26 into receptacle 30 through opening 50 using his/her hands. As laundry hamper 12 positions underneath furniture 14, space 22 that is mostly unused in homes is utilised efficiently to store articles of clothing 26. This results in saving space in homes. As specified above, laundry hamper 12 positions underneath furniture 14, user 24 need not have to bend and place articles of clothing 26 inside receptacle 30. User 24 can simply throw down articles of clothing 26 in front of receptacle 30 and kick articles of clothing 26 into receptacle 30 without bending. This saves time and effort needed to place articles of clothing 26 in receptacle 30.

Figure 5:
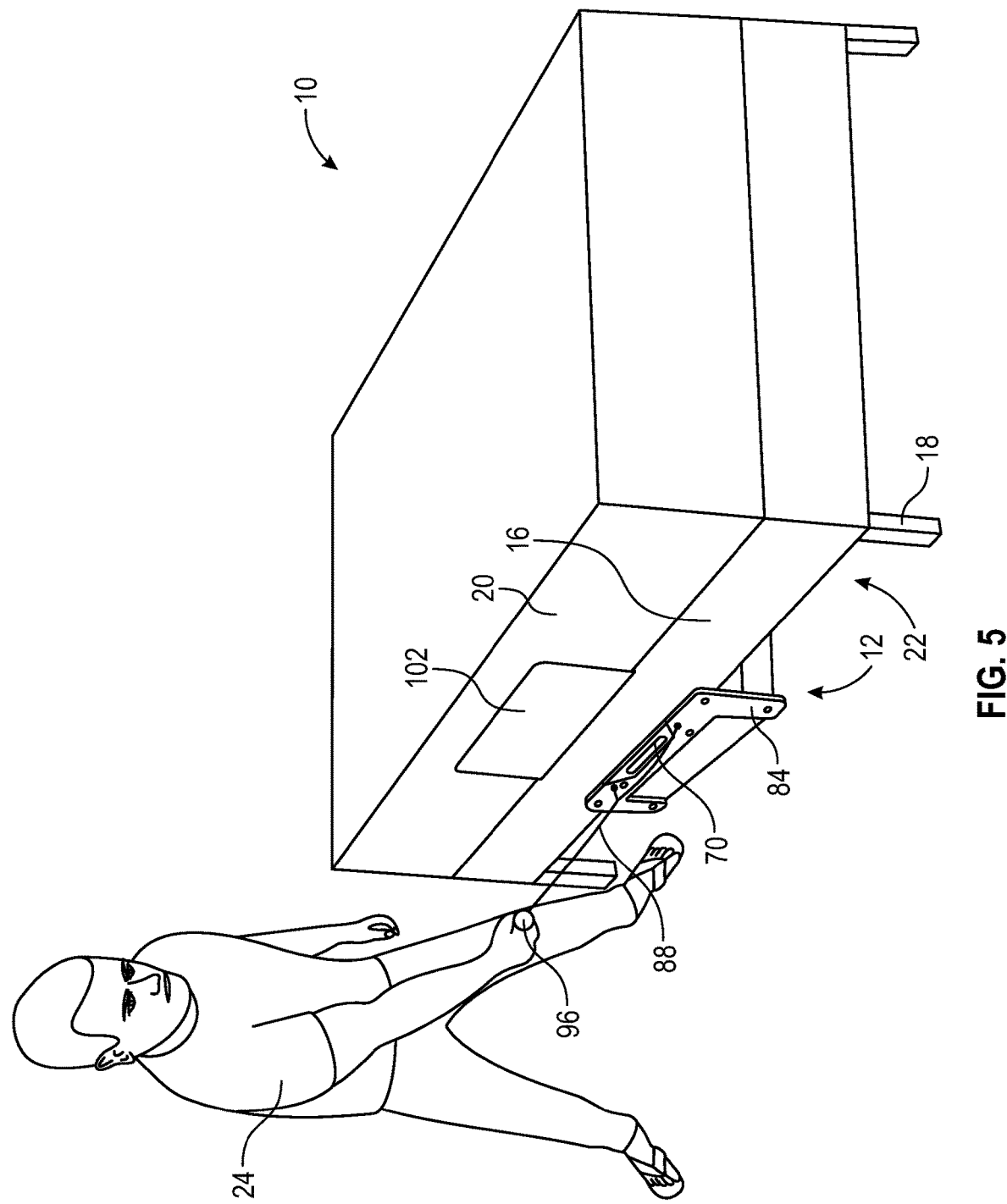
FIG. 5 illustrates a side perspective view of the laundry hamper being pulled by a user.
Figure 6:
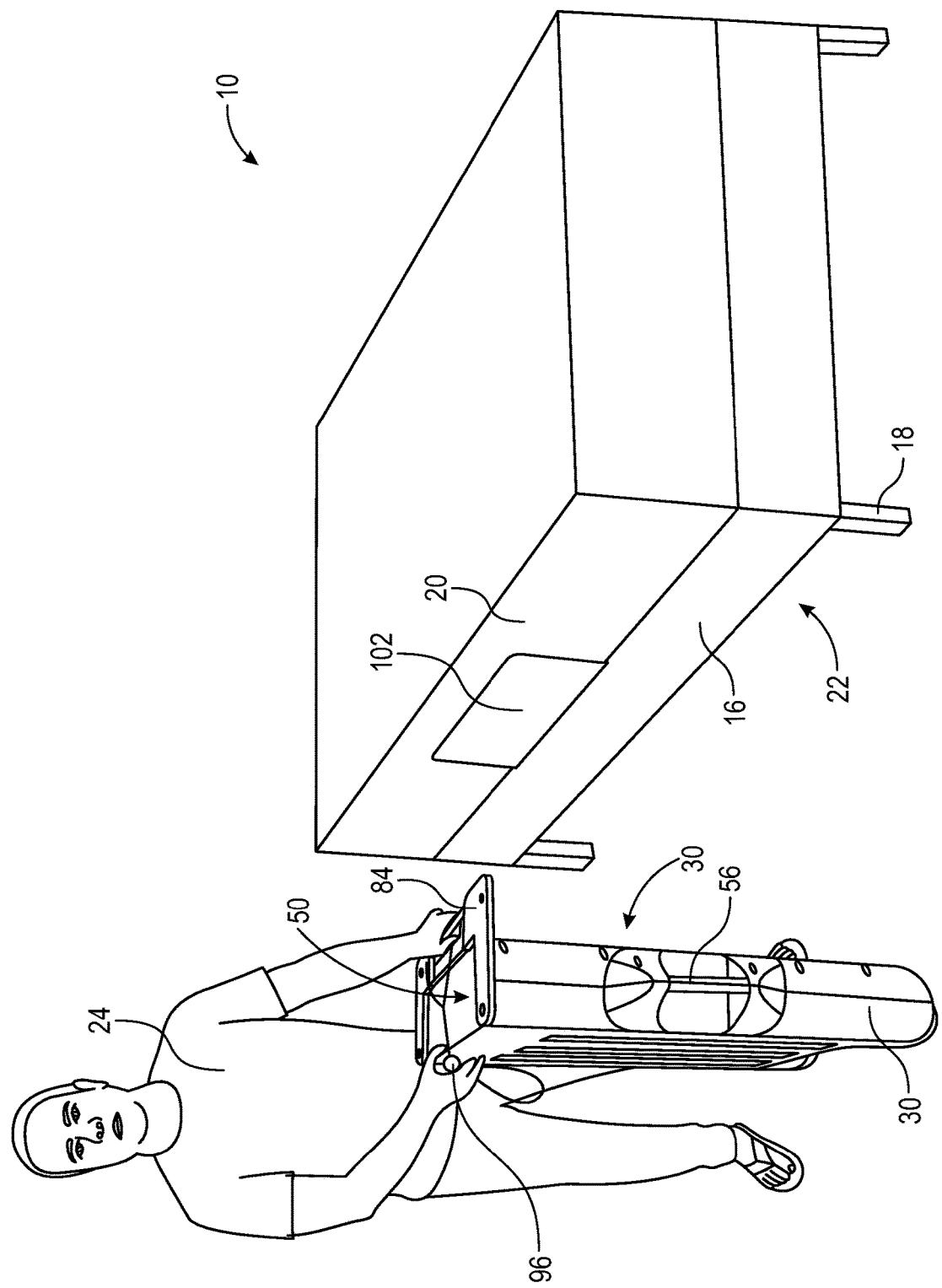
FIG. 6 illustrates a front perspective view of the laundry hamper being placed in an upright position by the user.

When needed say, when receptacle 30 is filled with articles of clothing 26, user 24 disengages/detaches handle 96 from L-shaped bracket 100 and pulls receptacle 30 from underneath furniture 14 with the help of flexible connecting member 88, as shown in FIG. 5. Alternatively, user 24 holds rim handle 78 and pulls out receptacle 30 from underneath furniture 14 without having to use flexible connecting member 88 and handle 96. Further, user 24 positions receptacle 30 over the ground such that second end 34 (wheels 66) of receptacle 30 faces the ground, as shown in FIG. 6. As can be seen from FIG. 6, opening 50 is facing up and if needed, user 24 adds or removes articles of clothing 26 from receptacle 30. Alternatively, user 24 holds handle 96 and pulls receptacle 30 storing articles of clothing 26 to another place, e.g., to a washing machine for washing articles of clothing 26. Here, user 24 pulls receptacle 30 from one place to another with the help of wheels 66 at second end 34 of receptacle 30. Handle 96 allows user 24 to pull receptacle 30 from underneath furniture 14 and eliminates bodily contortion (i.e. bending) for user 24 and minimizes bodily contortion in the process of laundry hamper 12 removal, replacement and transportation.

Figure 7A:
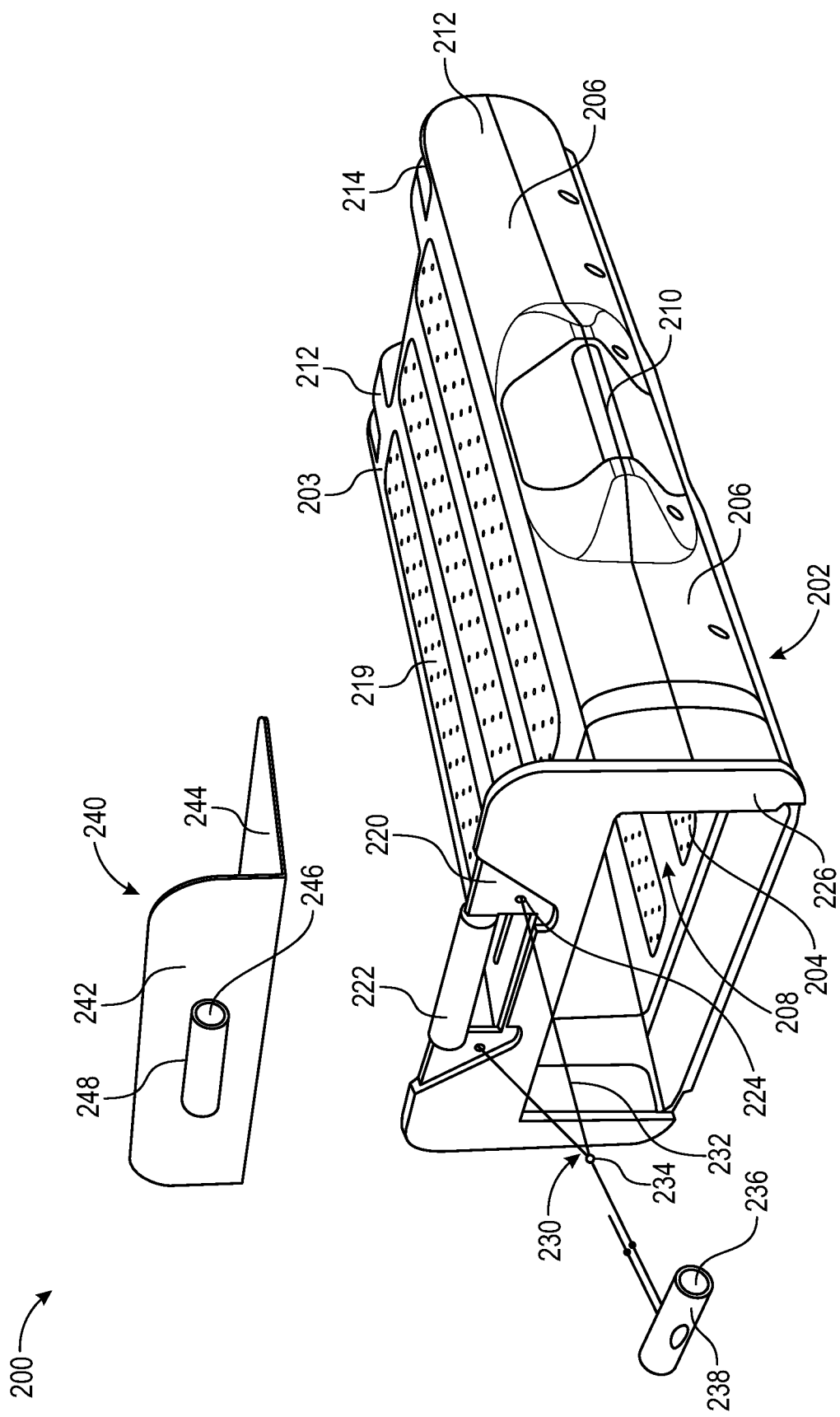
FIGS. 7A and 7B illustrate a front perspective view and a rear perspective view, respectively of a laundry hamper, in accordance with another embodiment of the present invention.
Figure 7B:
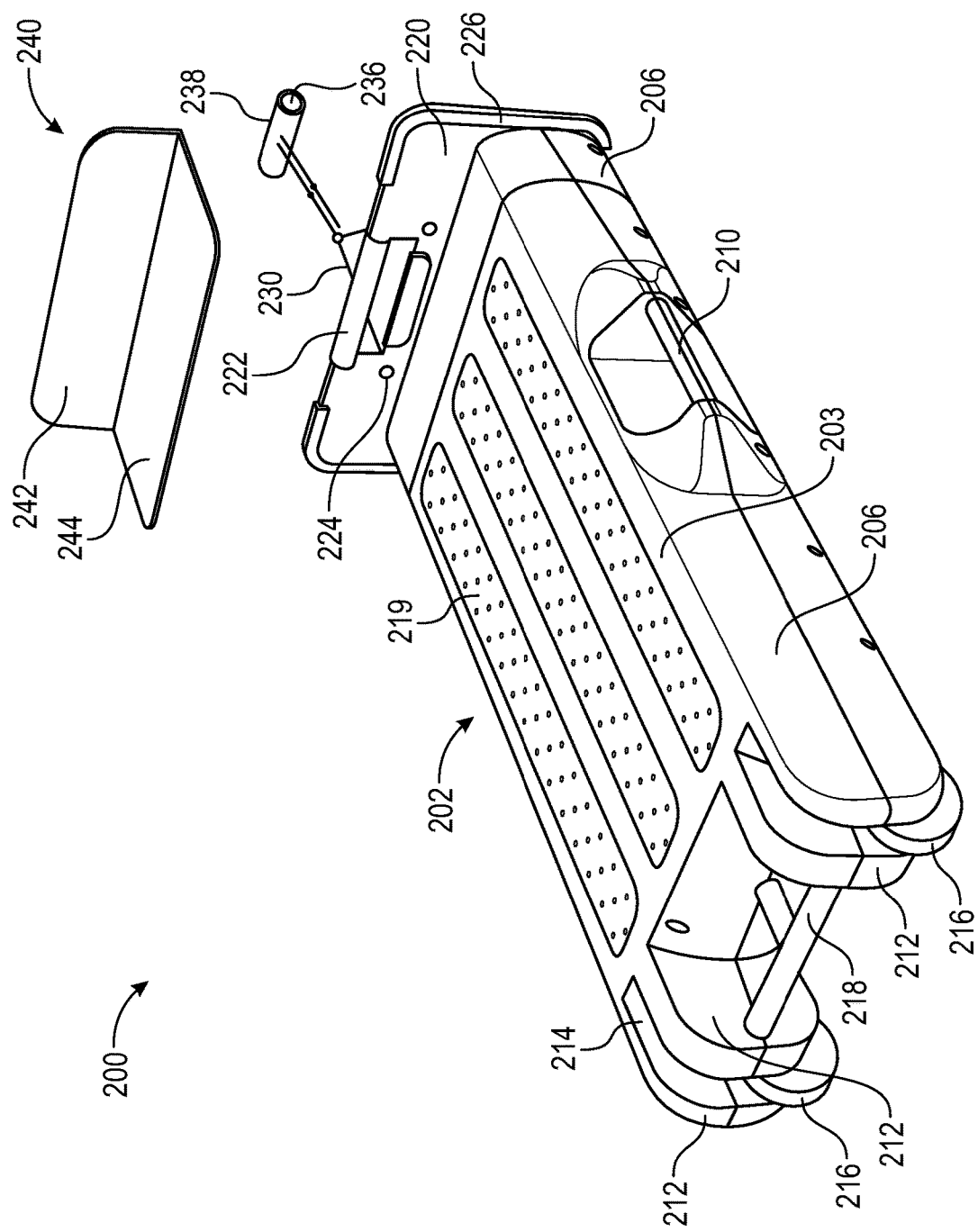

FIGS. 7A and 7B show a front perspective view and a rear perspective view, respectively of a laundry hamper 200, in accordance with another embodiment of the present invention. Laundry hamper 200 includes receptacle 202 having first panel 203 and second panel 204. First panel 203 indicates an upper panel and second panel 204 indicates a lower panel. Each of first panel 203 and second panel 204 includes sidewalls 206 forming a receptacle 202 with an opening 208 at the front. Receptacle 202 includes receptacle handles 210, each receptacle handles 210 extending outwardly from sidewalls 206.

At rear end, receptacle 202 encompasses extended walls 212 with grooves 214 for receiving wheels 216, as shown in FIG. 7B. Here, wheels 216 connect with the help of connecting rod 218. Further, each of first panel 203 and second panel 204 includes aeration holes 219. Aeration holes 219 provide ventilation and prevent mold and mildew growth on soiled articles of clothing stored in receptacle 202.

Laundry hamper 200 encompasses rim 220 having rim handle 222 at the top. Rim 220 includes holes 224 adjacent to rim handle 222 for receiving flexible connecting members 232. In the present embodiment, laundry hamper 200 includes pad 226 that wraps around rim 220 (similar to pad 84 in FIG. 2, for example). Further, laundry hamper 200 includes handle assembly 230. Handle assembly 230 includes flexible connecting members 232 drawn through holes 224 at rim 220. Flexible connecting members 232 present cord lock 234 that connects flexible connecting members 232. Further, flexible connecting member 232 connects to first handle 236. First handle 236 includes a magnetic member (similar to handle 96, in FIG. 2, for example). First handle 236 is surrounded by handle cushion 238.

Further, laundry hamper 200 includes L-shaped bracket 240 (similar to L-shaped bracket 100, in FIG. 2, for example). L-shaped bracket 240 encompasses first planar region 242 positioning parallel to the ground and second planar region 244 extending perpendicularly from first planar region 242.

Figure 8A:
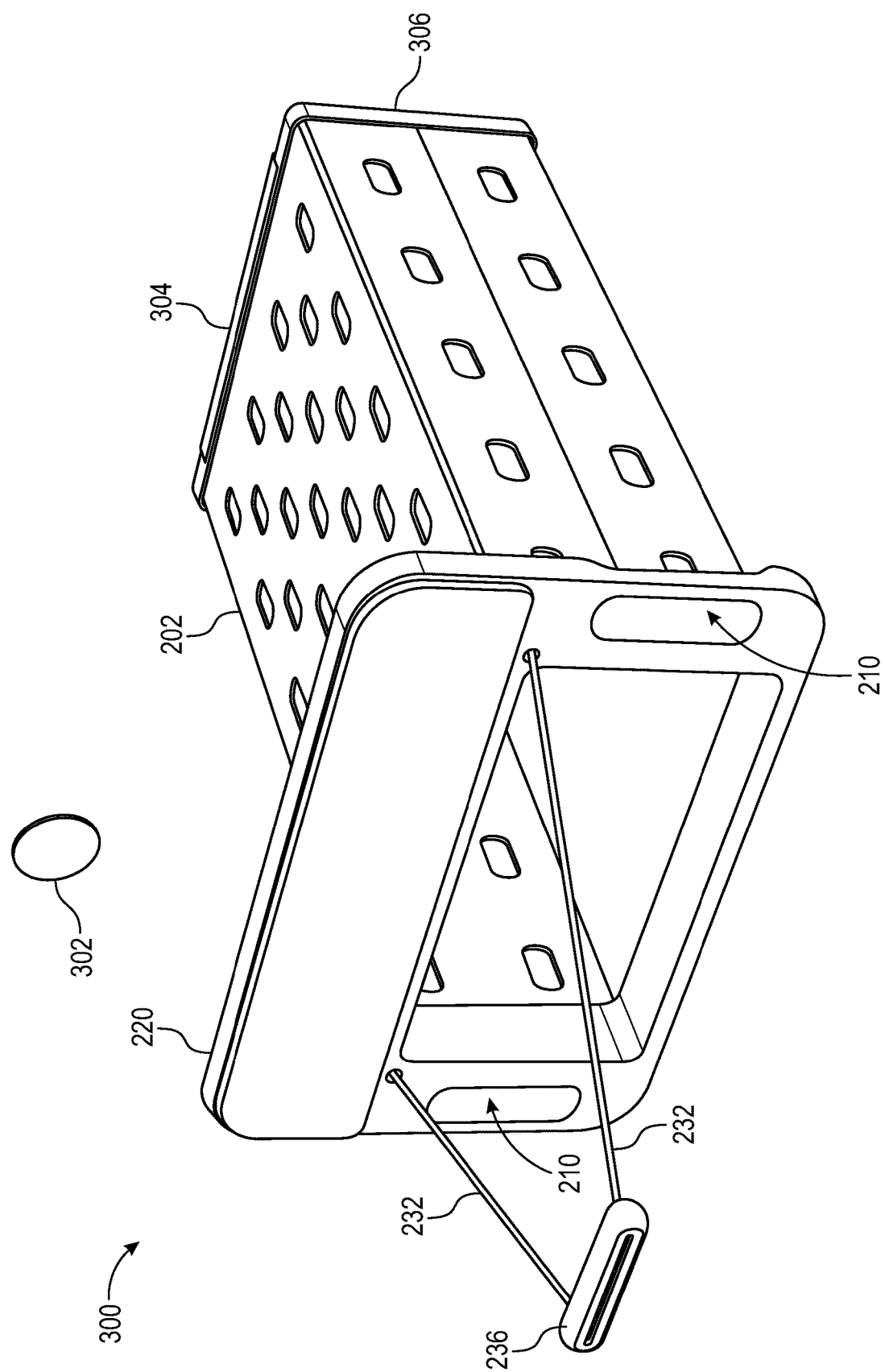
FIGS. 8A and 8B illustrate a front perspective view and a rear perspective view, respectively of a laundry hamper, in according with another embodiment of the present invention.
Figure 8B:
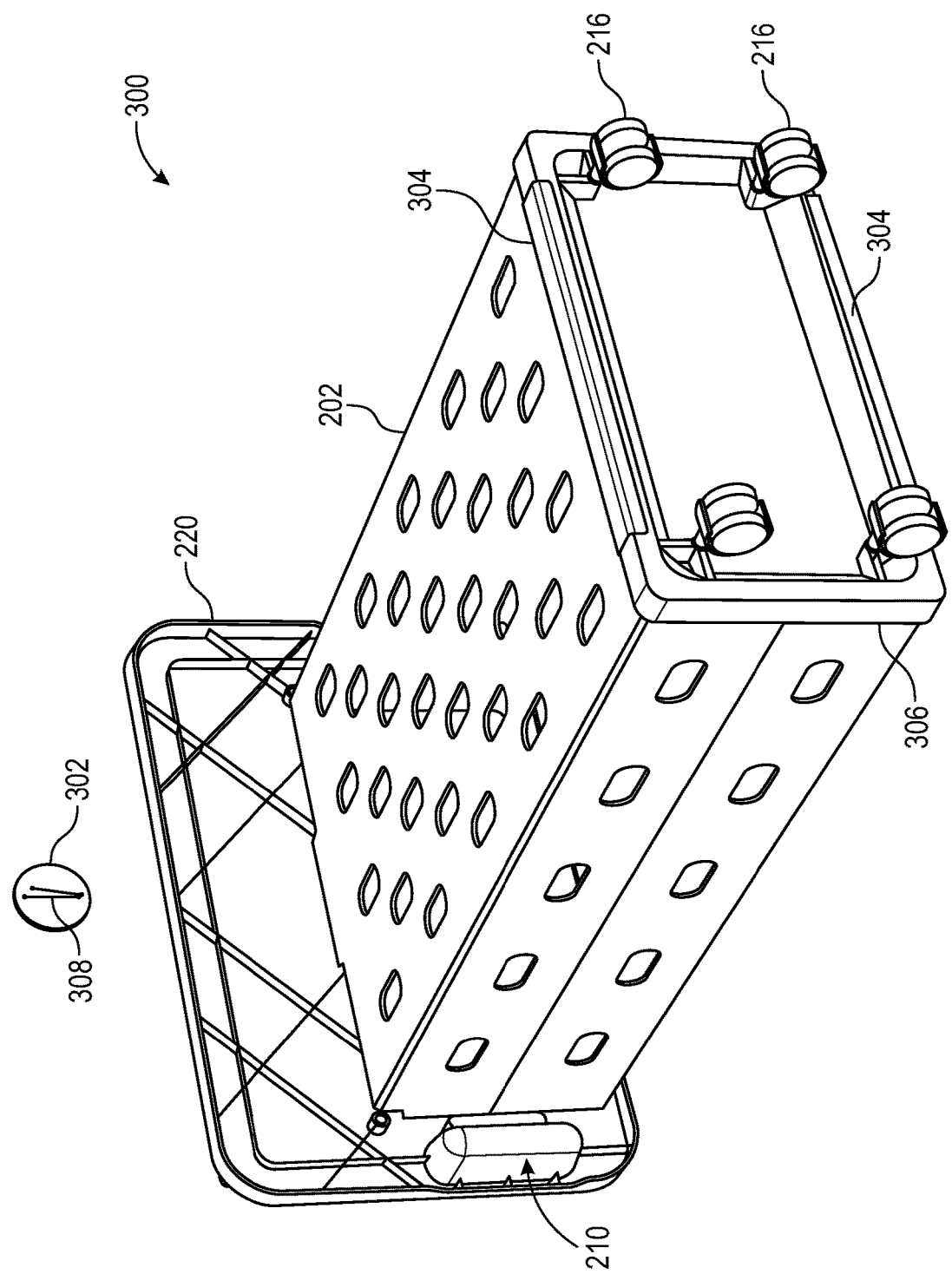

In another embodiment, as shown in FIGS. 8A and 8B, a laundry hamper 300 has handles 210 on the rim 220 of the hamper 300. Furthermore, in any of the embodiments disclosed, the handles may be placed in different regions, without detracting from the spirit of the invention. The hamper 300 includes a receptacle 202 that has side walls and a bottom wall 306. On the outside of the bottom wall are wheels 216. Along edges of the bottom of the hamper 300 are bumpers 304 that provide protection for the hamper 300 and/or ground when the hamper 300 is being pulled out from under a bed or other furniture. The bumpers 304 may be a soft material such as felt, but may also be other materials such as rubber, plastic, textile, or the like. In this embodiment (but may apply to other embodiments described above), instead of an L-shaped bracket 240, there is a plate 302. The plate 302 may be a ferromagnetic plate may that is circular (as shown) but can be a variety of shapes without detracting from the spirit of the invention. While the L-shaped bracket 240 is secured within furniture by sliding the second planar region 242 between a mattress and board or box spring, in the embodiments shown in FIGS. 8A and 8B, the plate 302 is secured via a pin 308 that is capable of being secured to a mattress. Other means of securing the plate 302 to a mattress may also be used, such as hook and loop, button, stitching, glue, tape, or other means known in the art to secure items to mattresses.

In this manner, the user can attach and attach the handle 236 to the ferromagnetic plate 302 when the hamper 300 is being stored under furniture, and when the user wants to remove the hamper 300 from under the furniture, the user detaches the handle 236 from the ferromagnetic plate 302 and pulls the hamper out from under the furniture. This ferromagnetic plate 302 may replace the L-shaped bracket 102 in any of the previous embodiments and Figures described above.

Laundry hamper 200 operates similar to laundry hamper 12, as explained above. Laundry hamper 200 is shown to illustrate the smaller wheels 216 when compared with wheels 66 in at least FIG. 2.

The embodiments provide for several advantages over the prior art. For example, the presently disclosed laundry hamper utilises the space underneath a bed frame and allows articles of clothing to easily enter with applied force. The laundry hamper includes a rim acting as a wall or bracing element at the front of the receptacle to maintain the position of the receptacle beneath the edge of the bed frame. In addition, the laundry hamper utilises a plurality of handles i.e., receptacle handle, rim handle and handle to minimize bodily contortion (i.e., bending) for the specific purposes of accessing the receptacle, transportation, and deposition. Further, the laundry hamper includes wheels positioned at the rear of the receptacle to facilitate transportation.

While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A laundry hamper, adapted to fit under a furniture and contain articles of clothing, the laundry hamper comprising:
    a receptacle having an interior volume and an opening at one end;
    a rim formed at the opening of the receptacle;
    a plate not integrated with the receptacle;
    a flexible connecting member; and,
    a handle connected to the flexible connecting member, wherein the flexible connecting member connects to the handle at the rim at another end, wherein the handle is detachable from the plate, wherein the flexible connecting member connects the plate to the receptacle via the handle,
    whereby when a user detaches the handle from the plate, the user is able to pull the receptacle out from under the furniture without removing the plate from the furniture.

2. The laundry hamper of claim 1, wherein the receptacle comprises a plurality of receptacle handles positioned on sidewalls of the receptacle.

3. The laundry hamper of claim 1, wherein the receptacle comprises wheels at an opposite end of the opening, and wherein the wheels allow the receptacle to be transported from one location to another.

4. The laundry hamper of claim 1, wherein the receptacle comprises aeration holes.

5. The laundry hamper of claim 1, wherein the flexible connecting member is one of a rope, cord, leash, string, and tether.

6. The laundry hamper of claim 1, wherein the plate is an L-shaped bracket having a first planar region and a second planar region, wherein the second planar region is substantially perpendicular to the first planar region, and wherein the L-shaped bracket is made from a ferromagnetic material, and wherein the handle is magnetic, thereby allowing the handle to magnetically attach and detach from the L-shaped bracket.

7. The laundry hamper of claim 1, wherein the rim comprises an angled lip at a bottom end of the receptacle, and wherein the angled lip allows the articles of clothing to be slid into the receptacle.

8. The laundry hamper of claim 1, wherein the plate is affixed to the furniture at a height above the receptacle of the laundry hamper when the receptacle is laid in a horizontally flat orientation.

9. The laundry hamper of claim 1, wherein the laundry hamper further comprises a pad forming an extension about the rim, the rim preventing the laundry hamper from being pushed too far underneath the furniture and the pad for cushioning to protect the user.

10. The laundry hamper of claim 1, wherein the rim comprises a rim handle, and wherein the rim handle allows pulling out the receptacle from under the furniture.

11. The laundry hamper of claim 1,
    wherein the receptacle comprises a plurality of receptacle handles positioned on sidewalls of the receptacle;
    wherein the receptacle comprises wheels at an opposite end of the opening, and wherein the wheels allow the receptacle to be transported from one location to another;
    wherein the receptacle comprises aeration holes;
    wherein the flexible connecting member is one of a rope, cord, leash, string, and tether;
    wherein the plate is made from a ferromagnetic material, and wherein the handle is magnetic, thereby allowing the handle to magnetically attach and detach from the plate;
    wherein the rim comprises an angled lip at a bottom end of the receptacle, and wherein the angled lip allows the articles of clothing to be slid into the receptacle;
    wherein the laundry hamper further comprises a pad forming an extension about the rim, whereby the rim prevents the laundry hamper from being pushed too far underneath the furniture and the pad for cushioning to protect a user; and,
    wherein the rim comprises a rim handle, and wherein the rim handle allows pulling out the receptacle from under the furniture.

12. A method of providing a laundry hamper for fitting under a furniture and for placing articles of clothing, the method comprising steps of:
    providing a receptacle having an interior volume and an opening at one end;
    providing a rim formed at the opening of the receptacle;
    providing a plate not integrated with the receptacle;
    providing a flexible connecting member;
    providing a handle connected the flexible connecting member;
    positioning the receptacle under the furniture;
    connecting the plate substantially flush with the furniture;
    connecting the handle to the plate;
    inserting articles of clothing into the receptacle through the opening in a horizontal direction relative to a ground; and,
    pulling out the receptacle from under the furniture by pulling the handle, wherein the handle is positioned at a higher elevation with respect to the receptacle when the receptacle is positioned in a flat horizontal orientation.

13. The method of claim 12, further comprising providing aeration holes on the receptacle.

14. The method of claim 12, further comprising providing an angled lip at the rim corresponding to the opening of the receptacle for allowing the articles of clothing to enter the receptacle.

15. The method of claim 12, wherein the plate is an L-shaped bracket having a first planar region and a second planar region, wherein the second planar region is substantially perpendicular to the first planar region.

* * * * *